(12) United States Patent
Gronwall

(10) Patent No.: US 7,191,821 B2
(45) Date of Patent: *Mar. 20, 2007

(54) PLATE HEAT EXCHANGER

(75) Inventor: Jan Gronwall, deceased, late of Lomma (SE); by Kristina Gronwall, legal representative, Lomma (SE)

(73) Assignee: Alfa Laval Corporate AB, Lund (SE)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 66 days.

(21) Appl. No.: 10/527,177

(22) PCT Filed: Sep. 10, 2003

(86) PCT No.: PCT/SE03/01405

§ 371 (c)(1),
(2), (4) Date: Aug. 23, 2005

(87) PCT Pub. No.: WO2004/025205

PCT Pub. Date: Mar. 25, 2004

(65) Prior Publication Data

US 2006/0185834 A1 Aug. 24, 2006

(30) Foreign Application Priority Data

Sep. 10, 2002 (SE) .................................. 0202672

(51) Int. Cl.
F28F 9/007 (2006.01)
F28F 3/08 (2006.01)

(52) U.S. Cl. ........................................ 165/67; 165/167

(58) Field of Classification Search ................ 165/145, 165/157, 158, 166, 167, 67; 29/890.039
See application file for complete search history.

(56) References Cited

U.S. PATENT DOCUMENTS

| 1,727,124 | A | * | 9/1929 | Lonsdale | 165/166 |
| 2,621,028 | A | * | 12/1952 | Newhall | 165/167 |
| 3,448,796 | A | * | 6/1969 | Usher | 165/167 |
| 5,056,590 | A | * | 10/1991 | Bohn | 165/166 |
| 5,597,453 | A | | 1/1997 | Sears | |
| 6,382,313 | B2 | * | 5/2002 | Mitsumoto et al. | 165/159 |

(Continued)

FOREIGN PATENT DOCUMENTS

DE 3616746 A1 11/1987

(Continued)

OTHER PUBLICATIONS

International Search Report.

Primary Examiner—Teresa J. Walberg
(74) Attorney, Agent, or Firm—Fish & Richardson P.C.

(57) ABSTRACT

The invention relates to a plate heat exchanger and a method for manufacturing a plate heat exchanger. The plate heat exchanger includes a number of heat exchanger plates (1), which are substantially parallel to an extension plane and arranged adjacent to each other in a plate package (2). A first end plate (8) and a second end plate (9) are arranged on a respective side of the plate package. A first tie sheet (10) and a second tie sheet are arranged on a respective side of the plate package substantially perpendicular to the extension plane. At least one connection member (17) extends between the tie sheets outside one of the end plates (9) and at least one beam (16) extends outside the second end plate (8) in parallel to an extension plane in engagement with the attachment of each tie sheet (10).

22 Claims, 4 Drawing Sheets

U.S. PATENT DOCUMENTS 6,764,787 B2 * 7/2004 Grasso et al. ................ 165/166
2004/0211550 A1 * 10/2004 Finch et al. ................ 165/167

FOREIGN PATENT DOCUMENTS

| | | |
|---|---|---|
| DK | 171246 | 2/1996 |
| EP | 0384305 | 8/1990 |
| FR | 2314460 | 1/1977 |
| FR | 2420114 | 10/1979 |
| GB | 2130354 A | 5/1984 |

* cited by examiner

PLATE HEAT EXCHANGER

THE BACKGROUND OF THE INVENTION AND PRIOR ART

The present invention refers to a plate heat exchanger including a number of heat exchanger plates, which are substantially parallel to an extension plane and arranged adjacent to each other in a plate package, a first end plate and a second end plate, which are substantially parallel to said extension plane and arranged on a respective side of the plate package, and a device for keeping the plate package together in such a way that the heat exchanger plates abut each other. The invention also refers to a method for manufacturing a plate heat exchanger.

Such plate heat exchangers usually designed with thicker end plates, which are called frame plate and pressure plate, respectively. The plate package is kept together between these two plates by means of a number of tie bolts extending through the frame plate and the pressure plate beside the plate package. Since the plate package in may applications should be able to resist high inner pressures, the frame plate and the pressure plate become very thick and heavy. This means that the whole plate heat exchanger becomes heavy and expensive.

DK-B-171 246 also discloses a plate heat exchanger of the kind initially defined with a number of heat exchanger plates, which are substantially parallel to an extension plane and arranged beside each other in a plate package, a first end plate and a second end plate, which are substantially parallel to said extension plane and arranged on a respective side of the plate package. The plate heat exchanger includes two U-shaped sheets for keeping the plate package together and pressing the heat exchanger plates against each other. Each of the U-shaped sheets includes two legs extending from the main plane of the plates and being inclined towards each other. These legs engage and are introduced into external grooves of the end plates when the plate heat exchanger is mounted.

SUMMARY OF THE INVENTION

The object of the present invention is to provide a plate heat exchanger which is light, inexpensive and easy to manufacture.

This object is obtained by the plate heat exchanger initially defined, wherein the device for maintaining the plate package includes two separate tie sheets consisting of a first tie sheet and a second tie sheet, which are arranged on a respective side of the plate package substantially perpendicular to said extension plane, at least a first connection member extending between said tie sheets outside the first end plate, and at least a second connection member extending between said tie sheets outside the second end plate, wherein the first connection member includes at least a first attachment of each of said tie sheets and at least a first beam, which extends in parallel with said extension plane outside the first end plate and engages said first attachment of each tie sheet.

Such a plate heat exchanger may be manufactured in an easy manner by moving the tie sheets towards said beam when the plate package and said beam has been compressed so that the beams will engage the attachments or by laying the tie sheets against the plate package which is compressed, whereupon said beam is moved to engagement with said attachment of the two tie sheets. A plate heat exchanger having this design may be very light in comparison with conventional plate heat exchangers having frame and pressure plates through which a number of tie bolts extend, since the end plate/s of the plate heat exchanger according to the invention may be made substantially thinner than the frame and pressure plates of the conventional plate heat exchanger. The plate heat exchanger according to the invention is in particular suitable for heat exchangers with relatively small dimensions. The plate heat exchanger according to the invention is compact since the tie bolts which are used according to the previous technique are not any longer needed.

According to a preferred embodiment of the invention, the first connection member includes at least two first attachments and at least two first beams which are in engagement with the two first attachments of each tie sheet. Said two first attachments advantageously include a respective hole having a side, which sides are arranged in a common plane being substantially parallel to said extension plane.

According to a further embodiment of the invention, the second connection member includes at least a second attachment of each of said tie sheets and at least a second beam, which extends in parallel to the extension plane outside the second end plate and is in engagement with said second attachment of each tie sheet. Such a plate heat exchanger may be manufactured in an easy manner by moving the tie sheets to engagement with said first beam and second beam when the plate package and the beams have been compressed. Advantageously, the second connection member includes at least two second attachments and at least two second beams which are in engagement with the two second attachments of each tie sheet. Said two second attachments may include a respective hole having a side, which sides are arranged in a common plane being substantially parallel to said extension plane. Furthermore, the distance between said first attachment and said second attachment may be equal to the thickness of the plate package when the heat exchanger plates are compressed to tight abutment against each other. The tie sheets may advantageously include several sets of the first attachments and several sets of the second attachments. In such a manner, the same tie sheets may be used for plate heat exchangers with differing numbers of heat exchanger plates and thus with differing thickness.

According to a further embodiment of the invention, said holes have a rectangular shape with two short sides and two long sides, wherein said short sides extend substantially in parallel to said extension plane. Said beam may then have a height which is substantially equal to the length of said short side and a width which is significantly shorter than said long side.

According to a further embodiment of the invention, said tie sheets are corrugated in such a way that ridges and valleys are formed, which extend in a direction being substantially perpendicular to said extension plane. In such a way, the stiffness and resistance against bending of the tie sheets may be increased in the pulling direction.

According to a further embodiment of the invention, each heat exchanger plate includes at least two port holes, which together form two port hole channels of the plate heat exchanger, which channels extend through all heat exchanger plates and one of said end plates. Furthermore, a gasket may be arranged between each pair of adjacent heat exchanger plates for sealing an interspace between the adjacent plates. Advantageously, the gasket includes a curable polymer material which is applied and cured on one of said heat exchanger plates in each pair. Such a curable gasket material may be applied in an easy manner on the heat exchanger plates and then be cured prior to the mounting of the plate package.

The object defined is also achieved by a method for manufacturing a plate heat exchanger including number of heat exchanger plates, a first end plate, a second end plate, two separate tie sheets consisting of a first tie sheet and a second tie sheet, a first connection member and a second connection member, wherein the method includes the steps of:

arranging the heat exchanger plates substantially in parallel to an extension plane and adjacent to each other in a plate package between the first end plate and the second end plate, arranging the first tie sheet and the second tie sheet on a respective side of the plate package substantially perpendicular to said extension plane, arranging at least a first connection member between said tie sheets outside the first end plate, arranging at least a second connection member between said tie sheets outside the second end plate, wherein the first connection member includes at least a first attachment of each of said tie sheets and at least a first beam, which is arranged in parallel to said extension plane outside the first end plate in engagement with said first attachment of each tie sheet.

According to an advantageous embodiment of the method, the second connection member includes at least a second attachment of each of said tie sheets and at least a second beam, which is arranged in parallel to said extension plane outside the second end plate in engagement with said second attachment of each tie sheet. Said attachments may include a respective hole through the respective tie sheet, wherein said first beam extends through the holes of the first attachments and said second beam extends through the holes of the second attachments. The method may then include the steps of arranging the second end plate on said second beam, stacking the heat exchanger plates to said plate package on the second end plate, arranging the first end plate on the plate package, arranging the first beam on the first end plate, compressing said beams, end plates and plate package, attaching the tie sheets by moving the tie sheets towards the sides of the plate package in such a way that said first beam engages said first attachment of the two tie sheets and said second beam engages said second hole of the two tie sheets, and removing the compressing.

The object defined is also achieved by a method for manufacturing a plate heat exchanger including a number of heat exchanger plates, a first end plate, a second end plate, a first tie sheet, a second tie sheet, at least a first beam and at least a second beam, wherein the method includes a step of:

arranging the second end plate on said second beam, stacking the heat exchanger plates to a plate package on the second end plate, arranging the first end plate on the plate package, arranging said first beam on the first end plate, compressing said beams, end plates and plate package, attaching the tie sheets by moving the tie sheets towards the sides of the plate package in such a way that said first beam engages at least a first attachment of each of said two tie sheets and said second beam engages at least a second attachment of each of said two tie sheets, and removing the compressing.

According to an embodiment, the method includes the preceding step of arranging said second beam on a bed, whereupon the second end plate, the heat exchanger plates and the first end plate and said first beam are arranged on each other.

According to an advantageous embodiment of the method, a press tool is applied to said first beam for said compressing, whereupon the tie sheets are moved against the plate package in such a way that said beams will engage the respective attachment. Furthermore, at least one guide rod may extend perpendicularly from the bed and the end plates, and the heat exchanger plates may include at least one recess, wherein the end plates and the heat exchanger plates are arranged on the bed in such a way that said guide rod extends through said recess for positioning of said plates. Between adjacent heat exchanger plates, a gasket is advantageously arranged by applying a curable polymer material on one side of the heat exchanger plates and curing the polymer material for forming the gasket for tight abutment against an adjacent heat exchanger plate in the plate package.

BRIEF DESCRIPTION OF THE DRAWINGS

The present invention is now to be explained more closely through a description of various embodiments by way of example, and with reference to the drawings attached hereto.

DETAILED DESCRIPTION OF VARIOUS EMBODIMENTS OF THE INVENTION

Figure 1:
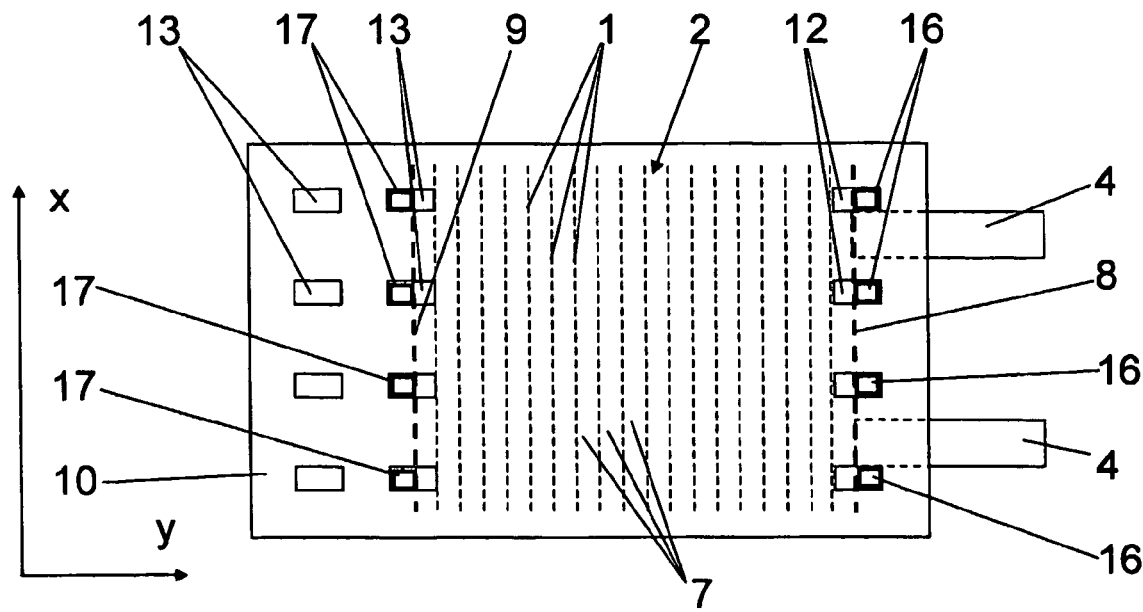
FIG. 1 discloses schematically a lateral view of a plate heat exchanger according to a first embodiment of the invention.

With reference to FIGS. 1–4, a first embodiment of a plate heat exchanger according to the invention is disclosed. The plate heat exchanger includes a number of heat exchanger plates 1 which are arranged beside each other and substantially in parallel with a common extension plane x, z. The heat exchanger plates 1 form a plate package 2 in the heat exchanger. Each heat exchanger plate 1 includes, in the embodiment disclosed, see FIG. 4, for port holes 3, which are arranged in alignment with each other in the different plates 1 for forming four port hole channels which connect to four inlet and outlet pipes 4. Each heat exchanger plate 1 also includes a corrugation 5 of ridges and valleys. The corrugation 5 may be designed in a plurality of various manners depending on for which application the plate heat exchanger is intended. Between each pair of adjacent heat exchanger plates, a gasket 6 is provided, which extends along an edge area of the heat exchanger plate 1. A part of the gasket 6 may in addition extend around two port holes 3 of each heat exchanger plate for giving access to different interspaces 7 between the heat exchanger plates 1 from different port hole channels. In such a way, the interspaces 7 between the heat exchanger plates 1 may by means of the gaskets 6 be closed from each other in such a way that every second interspace 7 is connected to two of the port hole channels and the interspaces 7 lying therebetween are in connection with the two other port hole channels in a manner known per se. It is to be noted that the invention is not limited to plate heat exchangers with four port hole channels, but the invention is also applicable to other types of plate heat exchangers, for instance with six port hole channels for three different media.

The gasket 6 may according to a preferred embodiment be formed by a curable polymer material. The polymer material is applied in the edge area in an uncured state as a highly viscous polymer mixture with a viscosity that amounts to between 300 and 800 Pas, preferably 350–650 Pas. By such a viscosity, the polymer mixture may easily be applied, and after the application be given a suitable cross-sectional shape. At the same time, it is possible with such a viscosity to prevent the polymer material from being too sticky and forming irregularities, in particular in joints between different parts of the gasket 6. Advantageously, the application of the gasket 6 may be mechanised by means of for instance an industrial processor robot (not shown). The curable polymer material may include silicon and in the embodiment disclosed, Liquid Silicon Rubber, LSR, is utilized. The polymer material is provided as a first component, including LSR and possibly and catalyst, and a second component including LSR and an activator, for instance in the form of a cross-linking agent. The two components are supplied to a mixing chamber via a respective supply conduit. They are mixed in the chamber substantially immediately before the polymer mixture is supplied to the heat exchanger plate 1. After the application the polymer material is cured. The curing may be done at room temperature during a relatively long time period, but is preferably made in a tempering furnace at a temperature of between 150° C. and 250° C., for instance approximately 200° C. The curing time may amount to between 30 minutes and 2 hours, for instance 1 hour. After the curing, the gasket is fixedly connected to the heat exchanger plate 1 on which the gasket 6 have been applied. Furthermore, the gasket 6 has obtained a suitable hardness that permits tight abutment against the adjacent heat exchanger plate 1 without any risk for a too strong adherence to the adjacent heat exchanger plate 1. Of course, also preproduced conventional gaskets may be used between adjacent heat exchanger plates 1.

The plate heat exchanger also includes a first end plate 8 and a second end plate 9. The end plates 8 and 9 are arranged on a respective side of the plate package and substantially in parallel to said extension plane x, z. The first end plate 8 also exhibits four port holes 3 and the four inlet pipes 4 are connected to the first end plate 8. The end plates 8 and 9 are somewhat stiffer and made from a thicker material than the heat exchanger plates 1. The end plates 8 and 9 may advantageously be substantially even. However, it is to be noted that the end plates 8 and 9 may have a significantly smaller thickness than the frame and pressure plates which are used in conventional heat exchangers with tie bolts.

Moreover, the plate heat exchanger includes a device for keeping the plate package 2 and the end plates 8 and 9 together and for pressing the plates 8, 1 and 9 against each other. In the first embodiment, this device includes two separate tie sheets consisting of a first tie sheet 10 and a second tie sheet 11. The two tie sheets 10 and 11 are arranged on a respective side of the plate package 2 in a plane x, y, which is substantially perpendicular to the extension plane x, z. The tie sheets 10, 11 may for instance be manufactured in the same material as the end plates 8, 9.

Each tie sheet 10, 11 includes a first set of attachments 12 and two second sets of attachments 13. In the embodiment disclosed, the attachments are designed as holes extending through the tie sheets 10, 11. Each set of holes 10, 13 includes in the embodiment disclosed four holes, which are arranged in a row after each other along a respective line being parallel to said extension plane x, z. It is to be noted that each tie sheet may include another number than the disclosed number of sets of holes, for instance three sets of first holes 12 and three sets of second holes 13. Each set of holes 12, 13 may also include another number than the four holes disclosed. It is to be noted that the attachments mentioned above, except from being designed as holes, may be designed in many various manners, for instance as shoulders, formed by ribs or other elements projecting from the surface of the tie sheets 10, 11, or recesses or grooves in the tie sheets 10, 11.

Moreover, said device includes four first beams 16 and four second beams 17. The first beams 16 extend through a respective hole in the first set of holes 12, and the four second beams 17 extend through a respective hole in one of the second sets of holes 13. In such a way, the plate package 2 and the two end plates 8 and 9 are compressed between the two first beams 16 and the second beams 17. The pulling force exerted by the plate package 2 will be absorbed by the two tie sheets 10 and 11. The first set of holes 12 and the first beams 16 thus form a first connection member whereas the second set of holes 13 and the second beams 17 form a second connection member between the tie sheets 10 and 11. The beams 16 and 17 may be of different kinds with different cross section. In the embodiment disclosed, hollow square beams with a substantially rectangular or square cross section are used. Also for instance I-beams, U-beams etc. may be used.

The distance between the first set of holes 12 and the actual second set of holes 13 is equal to the thickness of the plate package 2 when the heat exchanger plates 1 are pressed to tight abutment against each other. The holes 12, 13 preferably has a rectangular shape with two short sides and two long sides, wherein said short sides extend substantially in parallel to the extension plane x, z. The beams 16, 17 preferably have a height which is approximately equal to the length of the short sides of the holes and a width which is significantly less than the long sides of the holes.

The tie sheets 10 and 11 may be substantially plane but also designed with a corrugation of ridges and valleys, which extend in a direction being substantially perpendicular to said extension plane x, z. Examples of such a corrugation is disclosed for the second tie sheet 11 in FIG. 2.

Figure 2:
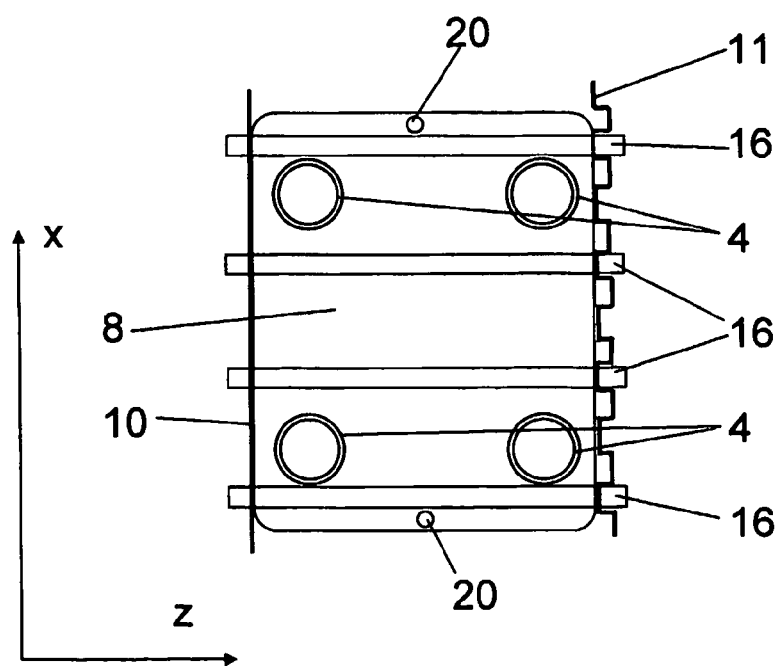
FIG. 2 discloses schematically a front view of the plate heat exchanger in FIG. 1.
Figure 3:
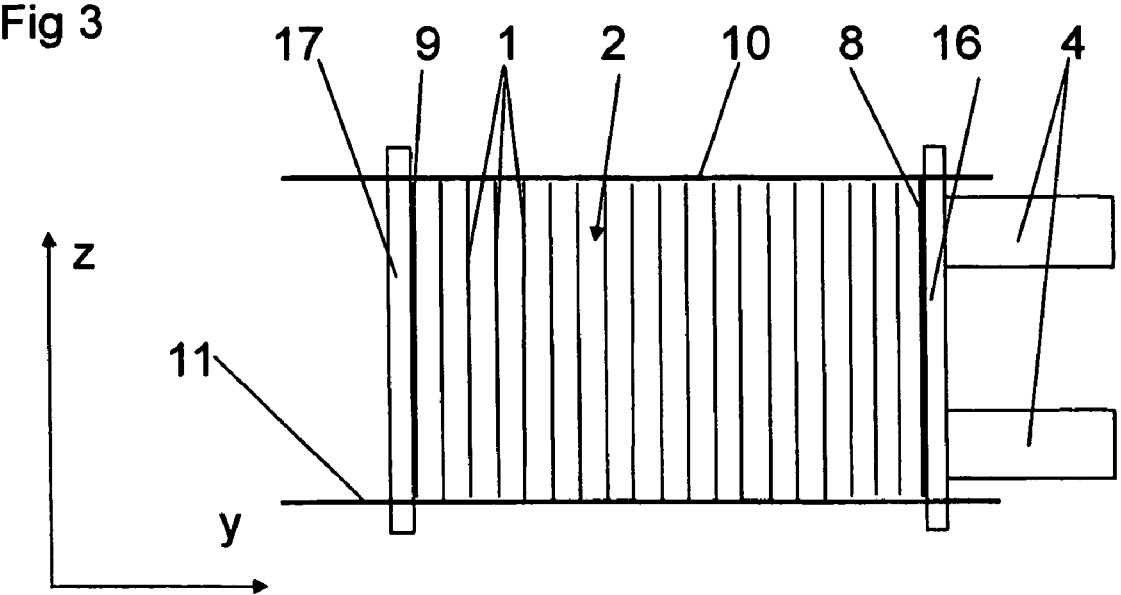
FIG. 3 discloses schematically a view from above of the plate heat exchanger in FIG. 1.
Figure 4:
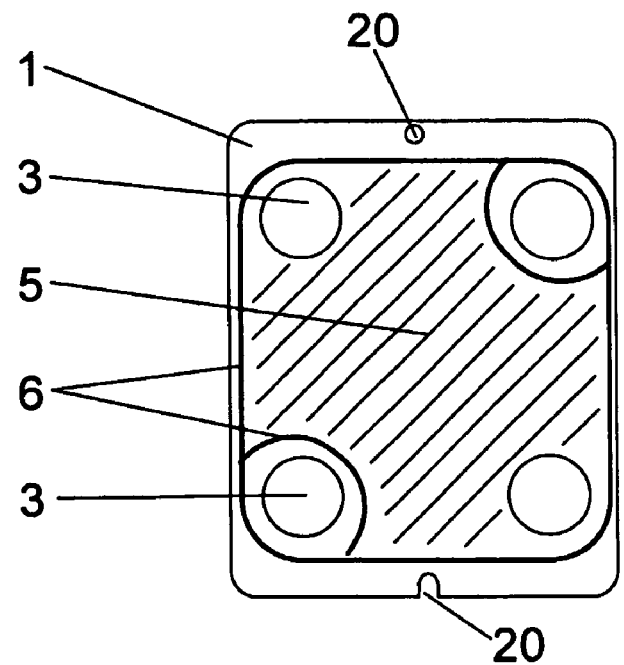
FIG. 4 discloses schematically a view of a heat exchanger plate of the plate heat exchanger in FIG. 1.
Figure 5:
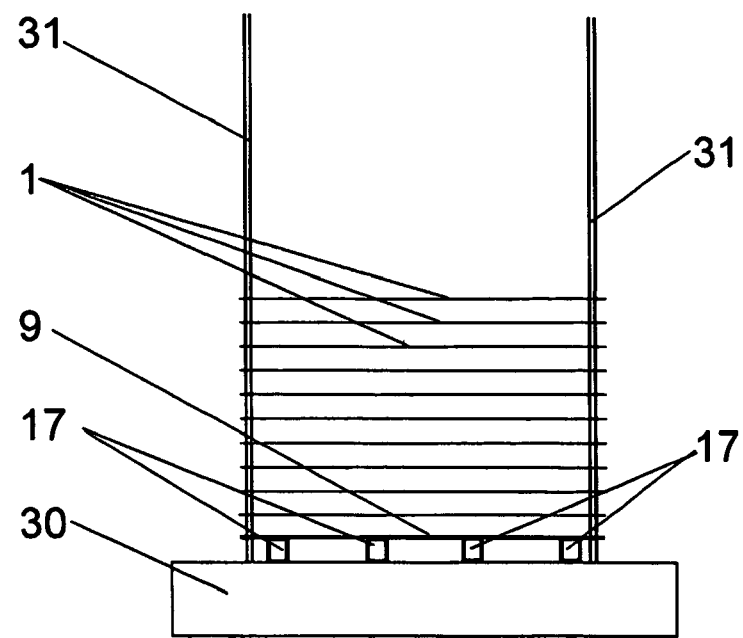
FIG. 5 discloses schematically a lateral view of the plate heat exchanger in FIG. 1 during manufacturing thereof.

Furthermore, each heat exchanger plate 1 and the end plates 8 and 9 include one or several recesses 20 in the form of holes or concave recesses extending from one edge of the plates 1, 8, 9. Examples of such types of recesses 20 are disclosed in FIG. 4. In FIG. 2 both recesses 20 have been designed as holes. The purpose of the recesses 20 is to guide the positioning of the plates 1, 8, 9 during the manufacturing, which is to be explained more closely below.

Figure 6:
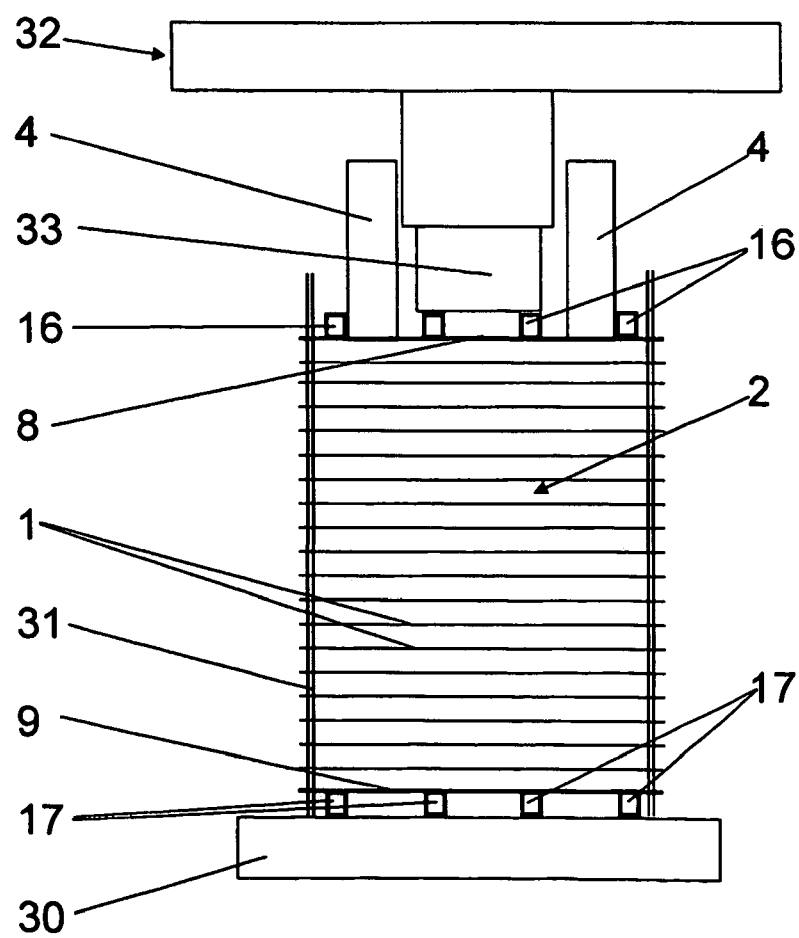
FIG. 6 discloses schematically a lateral view of the plate heat exchanger in FIG. 1 during another stage of the manufacturing.
Figure 7:
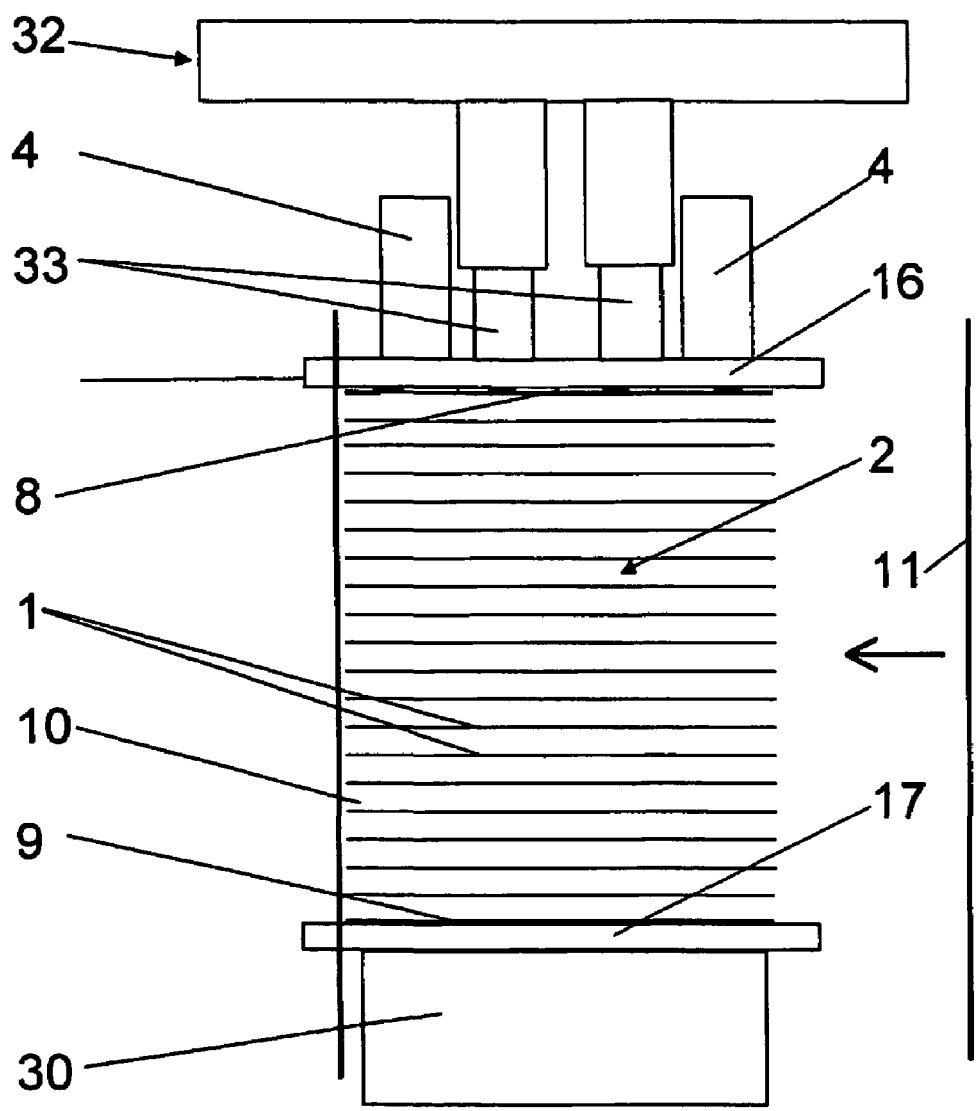
FIG. 7 discloses another lateral view of the plate heat exchanger in FIG. 1 during manufacturing thereof.

With reference to FIGS. 6 and 7, the manufacturing of a plate heat exchanger according to the invention is now to be explained. In a first step, the second beams are arranged on a bed 30 which may be a base member of a press tool. The base member has a working surface with a width which is somewhat shorter than the length of the beams 16, 17 so that the beams 16, 17 may project over the side surface of the bed 30, see FIG. 8. The bed 30 also includes two guide rods 31, which are fixedly connected to the bed 30 and extend perpendicularly upwardly from the bed 30. The guide rods may advantageously be arranged in different positions on the bed 30 for the manufacturing of plate heat exchangers with different size. Thereafter, the second end plate 9 is positioned on the second beams 17 in such a way that the guide rods 31 extend through a respective one of the recesses 20. The heat exchanger plates 1 are then stacked on the second end plate 9 and on each other until all plates 1 in the plate package 2 have been positioned. The heat exchanger plates 1 are provided with gaskets 6 which may have been attached in advance in the manner defined above. The heat exchanger plates 1 are all applied in such a way that the guide rods 31 extend through the holes 20. When all heat exchanger plates 1 have been positioned, the first end plate 8 is applied above the plate package 2 in such a way that the guide rods 31 extend through the recesses 20 of the first end plate 8 and in such a way that the inlet pipes 4 extend upwardly from the plate package. The first beams 16 are then positioned above the first end plate 8. By means of a press tool 32 with one or several press pistons, the plate package 2 is now compressed by applying the press piston or the press pistons 33 against the first beams 16 and pressing these downwardly towards the bed 30. When the plate package 2 has been compressed to a desired size, the tie sheets 10 and 11 are applied by being positioned against a respective side of the plate package 2 in such a way that the beams 16 and 17 extend through the respective holes 12, 13 of the two tie sheets 10 and 11. The press piston or pistons 33 are then retracted and the plate heat exchanger may be lifted from the bed 30 and the guide rods 31.

In case the attachments 12, 13 are designed as shoulders or recesses, the mounting may in principle take place in the same way, i.e. the plates 8, 1, 9 and the beams 16, 17 are compressed and the tie sheets 10, 11 are moved towards the plate package 2 until the beams 16, 17 will engage the respective shoulder or recess.

The invention is not limited to the embodiments disclosed but may be varied and modified within the scope of the following claims.

What is claimed is:

1. A plate heat exchanger comprising
    a number of heat exchanger plates, which are substantially parallel to an extension plane (x, z) and arranged adjacent to each other in a plate package,
    a first end plate and a second end plate, which are substantially parallel to the extension plane (x, z) and arranged on a respective side of the plate package, and
    a device for keeping the plate package together in such a way that the heat exchanger plates abut each other, wherein the device comprises
    two separate tie sheets consisting of a first tie sheet and a second tie sheet, which are arranged on a respective side of the plate package substantially perpendicular to the extension plane (x, z),
    at least a first connection member extending between the tie sheets outside the first end plate, and
    at least a second connection member extending between the tie sheets outside the second end plate,
    wherein the first connection member includes at least a first attachment of each of the tie sheets and at least a first beam, which extends in parallel with the extension plane (x, z) outside the first end plate and engages the first attachment of each tie sheet.

2. A plate heat exchanger according to claim 1, wherein the first connection member includes at least two first attachments and at least two first beams which engage the two first attachments of each tie sheet.

3. A plate heat exchanger according to claim 2, wherein the first attachments each include a respective hole having a side, which sides are arranged in a common plane being substantially parallel to the extension plane (x, z).

4. A plate heat exchanger according to claim 2, wherein the second connection member includes at least a second attachment of each of the tie sheets and at least a second beam, which extends in parallel to the extension plane (x, z) outside the second end plate and is held by the second attachment of each tie sheet.

5. A plate heat exchanger according to claim 4, wherein the second connection member includes at least two second attachments and at least two second beams which are held by the two second attachments of each tie sheet.

6. A plate heat exchanger according to claim 5, wherein the second attachments include a respective hole having a side, which sides are arranged in a common plane being substantially parallel to the extension plane (x, z).

7. A plate heat exchanger according to claim 4, wherein the distance between the first attachment and the second attachment is substantially equal to the thickness of the plate package when the heat exchanger plates are compressed to tight abutment against each other.

8. A plate heat exchanger according to claim 3, wherein the hole has a rectangular shape with two short sides and two long sides, wherein the short sides extend substantially in parallel with the extension plane (x, z).

9. A plate heat exchanger according to claim 8, wherein the beam has a height which is substantially equal to the length of the short side and a width which is significantly shorter than the long side.

10. A plate heat exchanger according to claim 1, wherein the tie sheets are corrugated in such a way that ridges and valleys are formed, which extend in a direction being substantially perpendicular to the extension plane (x, z).

11. A plate heat exchanger according to claim 1, wherein each heat exchanger plate includes at least two port holes, which together form two port channels of the heat plate exchanger, which channels extend through all heat exchanger plates and one of the end plates.

12. A plate heat exchanger according to claim 11, wherein a gasket is arranged between each pair of adjacent heat exchanger plates for sealing an interspace between adjacent plates.

13. A plate heat exchanger according to claim 12, wherein the gasket includes a curable polymer material which is applied and cured on one of the heat exchanger plates in each pair.

14. A method for manufacturing a plate heat exchanger including a plurality of heat exchanger plates, a first end plate, a second end plate, two separate tie sheets having a first tie sheet and a second tie sheet, a first connection member and a second connection member, comprising:
    arranging the heat exchanger plates substantially in parallel to an extension plane and adjacent to each other in a plate package between the first end plate and the second end plate,
    arranging the first tie sheet and the second tie sheet on a respective side of the plate package substantially perpendicular to the extension plane,
    arranging at least the first connection member between the tie sheets outside the first end plate, and
    arranging at least the second connection member between the tie sheets outside the second end plate,
    wherein the first connection member includes at least a first attachment of each of the tie sheets and at least a first beam, which is arranged in parallel to extension plane outside the first end plate in engagement with the first attachment of each tie sheet.

15. A method according to claim 14, wherein the second connection member includes at least a second attachment in each of the tie sheets and at least a second beam which is provided in parallel with the extension plane outside the second end plate in engagement with the second attachment in each tie sheet.

16. A method according to claim 15, wherein the attachments include a respective hole through the respective tie sheet, wherein the first beam extends through the holes of the first attachments and the second beam extends through the holes of the second attachments.

17. A method according to claim 15, including arranging the second end plate on the second beam, stacking the heat exchanger plates to the plate package on the second end plate, arranging the first end plate on the plate package, arranging the first beam on the first end plate, compressing the beams, end plates and plate package, attaching the tie sheets by moving the tie sheets towards the sides of the plate package in such a way that the first beam engages the first attachment of the two tie sheets and the second beam engages the second attachment of the two ties sheets, and removing the compressing.

18. A method for manufacturing a plate heat exchanger including a plurality of heat exchanger plates, a first end plate, a second end plate, two separate tie sheets having a first tie sheet and a second tie sheet, at least a first beam and at least a second beam, comprising:

arranging the second end plate on the second beam, stacking the heat exchanger plates to a plate package on the second end plate, arranging the first end plate on the plate package, arranging the first beam on the first end plate, compressing the beams, end plates and plate package, attaching the tie sheets by moving the tie sheets towards the sides of the plate package in such a way that the first beam engages at least a first attachment of each of the two tie sheets and the second beam engages at least a second attachment of each of the two tie sheets, and removing the compressing.

19. A method according to claim 18, wherein the method includes previously arranging the second beam on a bed, whereupon the second end plate, the heat exchanger plates, the first end plate and the first beam are arranged on each other.

20. A method according to claim 19, wherein a pressing tool is applied to the first beam for the compressing, whereupon the tie sheets are moved against the plate package in such a way that the beams will engage the respective attachment.

21. A method according to claim 19, wherein at least one guide rod extends perpendicularly from the bed and the end plates, and the heat exchanger plates include at least one recess, wherein the end plates and the heat exchanger plates are arranged on the bed in such a way that the guide rod extends through the recess for positioning of the plates.

22. A method according to claim 21, wherein a curable polymer material is applied to one side of the heat exchanger plates and the polymer material is cured for forming a gasket for tight abutment against an adjacent heat exchanger plate in the plate package.

* * * * *